US011866987B2

(12) United States Patent
Zhenyi

(10) Patent No.: US 11,866,987 B2
(45) Date of Patent: Jan. 9, 2024

(54) REDUNDANT BOLTWORK MECHANISM

(71) Applicant: SHANGHAI BAOLEI INDUSTRIAL CO., LTD, Shanghai (CN)

(72) Inventor: Xu Zhenyi, Shanghai (CN)

(73) Assignee: Shanghai Baolei Industrial Co., Ltd., Shanghai (CN)

( * ) Notice: Subject to any disclaimer, the term of this patent is extended or adjusted under 35 U.S.C. 154(b) by 624 days.

(21) Appl. No.: 17/072,359

(22) Filed: Oct. 16, 2020

(65) Prior Publication Data

US 2021/0115724 A1 Apr. 22, 2021

Related U.S. Application Data

(60) Provisional application No. 62/916,362, filed on Oct. 17, 2019.

(51) Int. Cl.
*E05G 1/04* (2006.01)
*E05B 65/00* (2006.01)

(52) U.S. Cl.
CPC ............ *E05G 1/04* (2013.01); *E05B 65/0075* (2013.01)

(58) Field of Classification Search
CPC .. E05G 1/04; E05G 1/02; E05G 1/026; E05B 65/0075
USPC ........................................................ 109/59 R
See application file for complete search history.

(56) References Cited

U.S. PATENT DOCUMENTS 4,470,277 A * 9/1984 Uyeda ................. E05B 65/0075 70/284
4,831,851 A 5/1989 Larson
4,986,099 A 1/1991 Johnson et al.
5,603,234 A * 2/1997 Lozier ................. E05B 65/0075 70/120
8,479,543 B2 * 7/2013 Yang .......................... E05G 1/04 70/284
9,238,929 B2 * 1/2016 Cho ........................... E06B 3/36
9,951,546 B1 4/2018 Maniaci
2006/0032418 A1 2/2006 Smith
2012/0060726 A1 * 3/2012 Yao ..................... E05B 65/0075 109/63.5

FOREIGN PATENT DOCUMENTS

| | | | |
|---|---|---|---|
| CN | 2326707 | Y | 6/1999 |
| CN | 2916062 | Y | 6/2007 |
| CN | 200982120 | Y | 11/2007 |
| CN | 201381698 | Y | 1/2010 |
| CN | 201396016 | Y | 2/2010 |

(Continued)

*Primary Examiner* — Suzanne L Barrett
(74) *Attorney, Agent, or Firm* — Katten Muchin Rosenman LLP

(57) ABSTRACT

Disclosed herein is a redundant boltwork mechanism comprises a master lock plate and a sublock plate slidably coupled to the master lock plate. A first lock is coupled to the mater lock plate and a second lock is coupled to the sublock plate. A cross slide with a plurality of bolts and at least one other slide are coupled to the safe door such that turning that handle of the safe door causes movement of the cross slide and at least one other slide from a first position to a second position, allowing the safe door to be opened. The safe door can be unlocked by unlocking either the first lock or the second lock, which causes the second lock tongue to retract from blocking the at least one slide.

15 Claims, 4 Drawing Sheets

(56) References Cited

FOREIGN PATENT DOCUMENTS

| | | | | | |
|---|---|---|---|---|---|
| CN | 201843442 | U | | 5/2011 | |
| CN | 202012247 | U | | 10/2011 | |
| CN | 202117434 | U | | 1/2012 | |
| CN | 102444333 | A | * | 5/2012 | ......... E05B 17/2007 |
| CN | 202215063 | U | | 5/2012 | |
| CN | 101832085 | B | | 9/2013 | |
| CN | 103216173 | B | | 3/2015 | |
| CN | 204252726 | U | | 4/2015 | |
| CN | 104879021 | A | | 9/2015 | |
| CN | 105625863 | B | | 10/2017 | |
| CN | 105822176 | B | | 2/2018 | |
| CN | 106014088 | B | | 3/2018 | |
| CN | 105971411 | B | | 4/2019 | |
| EP | 0169204 | B1 | | 6/1988 | |
| EP | 1164246 | A2 | * | 12/2001 | ......... E05B 65/0075 |
| EP | 1288423 | B1 | | 2/2004 | |
| GB | 190902058 | A | * | 10/1909 | |

* cited by examiner

REDUNDANT BOLTWORK MECHANISM

CROSS-REFERENCE TO RELATED APPLICATIONS

This application claims priority to U.S. Provisional Application Ser. No. 62/916,362, filed Oct. 17, 2019, the entire contents of which are hereby incorporated by reference in their entirety.

FIELD OF THE INVENTION

The present invention discloses a redundant boltwork mechanism with two separate locks configured to be unlocked by actuating either lock.

BACKGROUND

Most current safe designs comprise a single lock that must be unlocked so that the actuate boltwork can be retracted and the safe door can be opened. If there is any mechanical failure in the lock or if the combination/password is lost, a locksmith must be called in order to open the safe. This can be costly and time consuming. Similarly, if the lock is an electronic lock, the safe cannot be opened if there is a power outage or battery failure. Therefore, there exists a need for a redundant boltwork mechanism having two locks allowing the safe to be unlocked by unlocking either safe lock.

SUMMARY

The redundant boltwork mechanism comprises a master lock plate and a sublock plate slidably coupled to the master lock plate. A first lock is coupled to the master lock plate and a second lock is coupled to the sublock plate. A cross slide with a plurality of bolts and at least one other slide are coupled to the safe door such that turning that handle of the safe door causes movement of the cross slide and at least one other slide from a first position to a second position, allowing the safe door to be opened. The safe door can be unlocked by unlocking either the first lock or the second lock, which causes the second lock tongue to retract from blocking the at least one slide.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Figure 1:
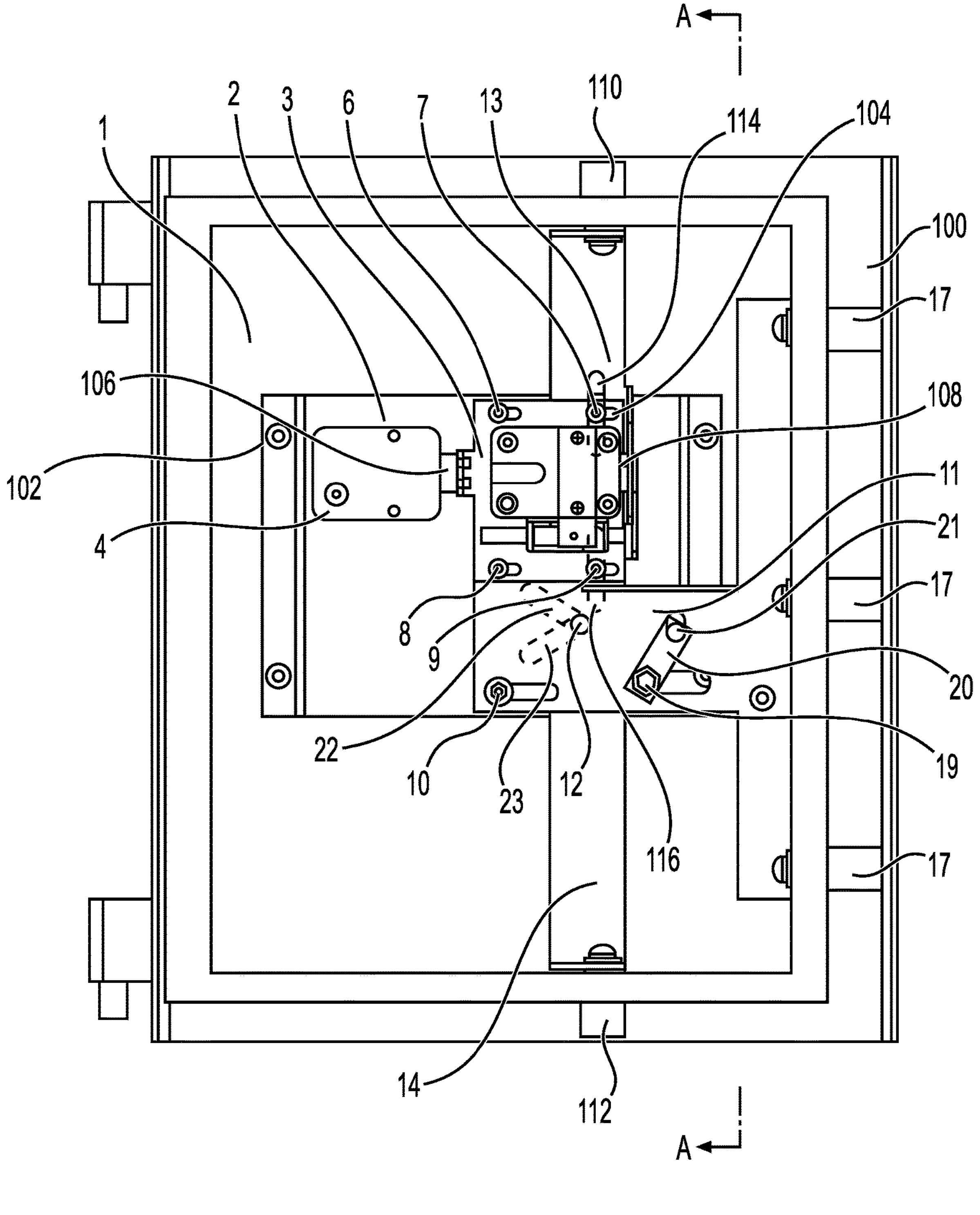
FIG. 1 is a schematic view of an embodiment of the redundant boltwork mechanism with both locks locked.
Figure 2:
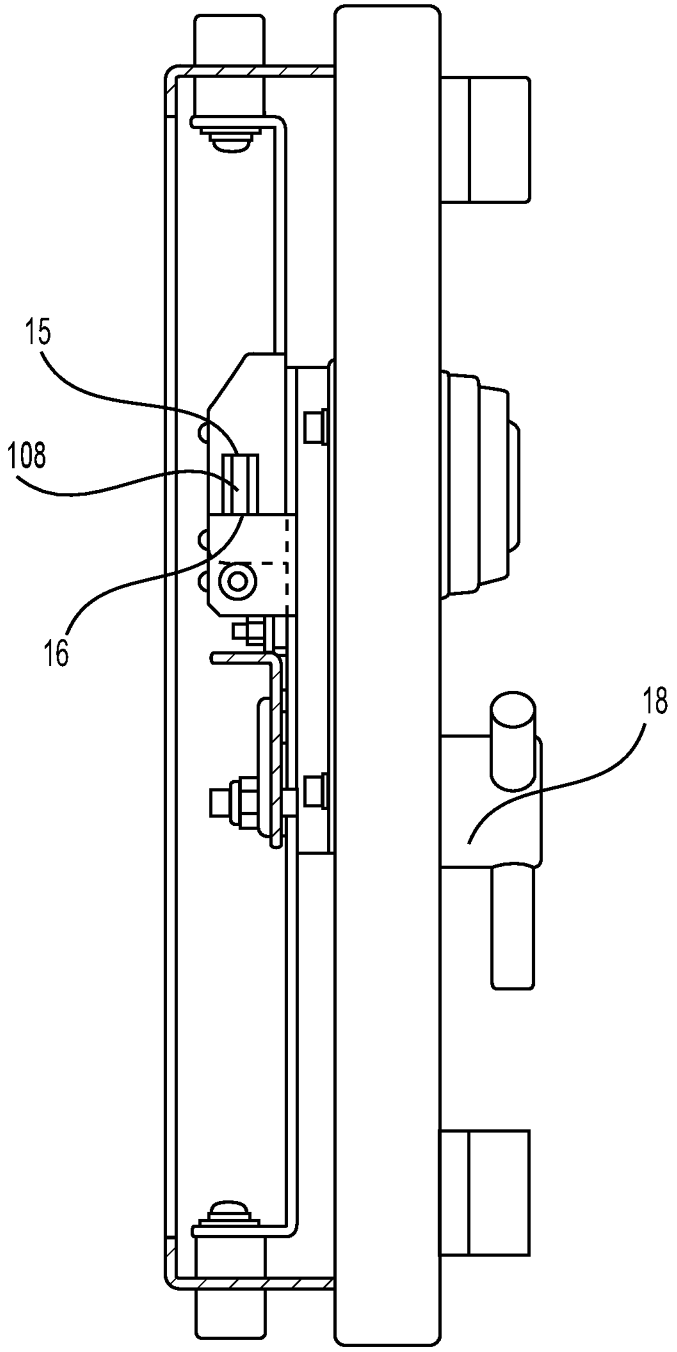
FIG. 2 is a cross-sectional view taken in the direction of the arrow A of FIG. 1.

Referring to FIGS. 1 and 2, the redundant boltwork mechanism 100 is coupled to an interior of safe door 1 as depicted. A master lock plate 2 is immovably coupled to safe door 1 via four bolts 102. First lock 4, cross slide 11, first slide 13, and second slide 14 are all coupled to master lock plate 2.

A sublock plate 3 is coupled to master lock plate 2 via first guiding column 6, second guiding column 7, third guiding column 8, and fourth guiding column 9 which extend from master lock plate 2 through four sublock plate grooves 104. This allows sublock plate 3 to move horizontally with respect to master lock plate 2 as the first lock tongue 106 is extended or retracted. Specifically, as depicted in FIG. 1, the first lock tongue 106 of first lock 4 is coupled to sublock plate 3. When first lock tongue 106 is retracted, sublock plate 3 is driven to the left (FIG. 3) as will be described later. The second lock 5 is coupled to a surface of sublock plate 3.

First lock 4 and second lock 5 may be any type of lock, mechanical or electrical, that is able to retract a lock latch. Examples of lock types include, but are not limited to, key locks, digital locks, and combination locks.

Cross slide 11 is movably coupled to master lock plate 2 via third guiding column 8, fourth guiding column 9, and fifth guiding column 10, each of which extend from master lock plate 2 through horizontal grooves in cross slide 11. Cross slide 11 is driven to move horizontally by turning hand wheel 18. The end of cross slide 11 comprises a plurality of transverse door bolts 17 (i.e., latches extending along the lateral direction), for example, three.

In this embodiment, hand wheel 18 is located on the outer side of safe door 1 and dial block 20 is disposed on the inner side of the cabinet door 1. Dial block 20 is coupled to the hand wheel 18 through connecting shaft 19, causing dial block 20 to rotate as hand wheel 18 is rotated. Dial pin 21 is fixed on the dial block 20, and a driving groove (not shown) extending along the longitudinal direction is defined in the cross slide 11. The dial pin 21 extends into the driving groove. Through these connections, the turning of hand wheel 18 causes cross slide 11 to move to the left which withdraws the horizontal door bolts 17, allowing the safe door 1 to be opened.

A drive pin 12 is coupled to cross slide 11 and extends through first oblique groove 22 in first slide 13 and second oblique groove 23 in second slide 14. An end of first slide 13 further comprises upper bolt 110 and an end of second slide 14 comprises lower bolt 112. Both first slide 13 and second slide 14 are limited to vertical (up/down) movement. First slide 13 comprises first longitudinal chute 114 through which second guiding column 7 extends. Similarly, second slide 14 comprises second longitudinal chute 116 (not shown) through which fourth guiding column 9 extends.

When drive pin 12 moves left and right under the driving of the cross slide 11, first slide 13 can move up/down correspondingly through the first oblique groove 22 and first longitudinal chute 114 and second slide 14 can move down/up correspondingly through second oblique groove 23 and second longitudinal chute 116.

As depicted in FIG. 2, the side of first slide 13 is provided with first rib 15 and the side of second slide 14 is provided with second rib 16. When safe door 1 is locked, the second lock tongue 108 of second lock 5 protrudes between first rib 15 and second rib 16, blocking movement of first slide 13 and second slide 14.

First slide 13 and second slide 14 may also comprise one or more longitudinal sliding grooves which interface with a guide column on master lock plate 2 to further facilitate the vertical movement of first slide 13 and second slide 14.

It should be obvious on one of ordinary skill in the art that the redundant boltwork mechanism 100 could also function with either first slide 13 or second slide 14 removed. However, the inclusion of both slides 13 and 14 obviously provides enhanced protection.

As shown in FIGS. 1 and 2, when first lock 4 and second lock 5 are closed, first rib 15 of first slide 13 is blocked by the upper surface of second lock tongue 108 of second lock 5, so that first slide 13 cannot move downward. Second rib 16 of second slide 14 is blocked by the underside of second lock tongue 108 of second lock 5, so that second slide 14 cannot move upward. Because first slide 13 cannot move downward and second slide 14 cannot move upward, cross slide 11 is prevented from moving left. This also prevents dial block 20 and hand wheel 18 from being rotated. The door bolts 17, upper bolt 110, and lower bolt 112 cannot be withdrawn and maintain the safe door 1 in a locked state.

Figure 3:
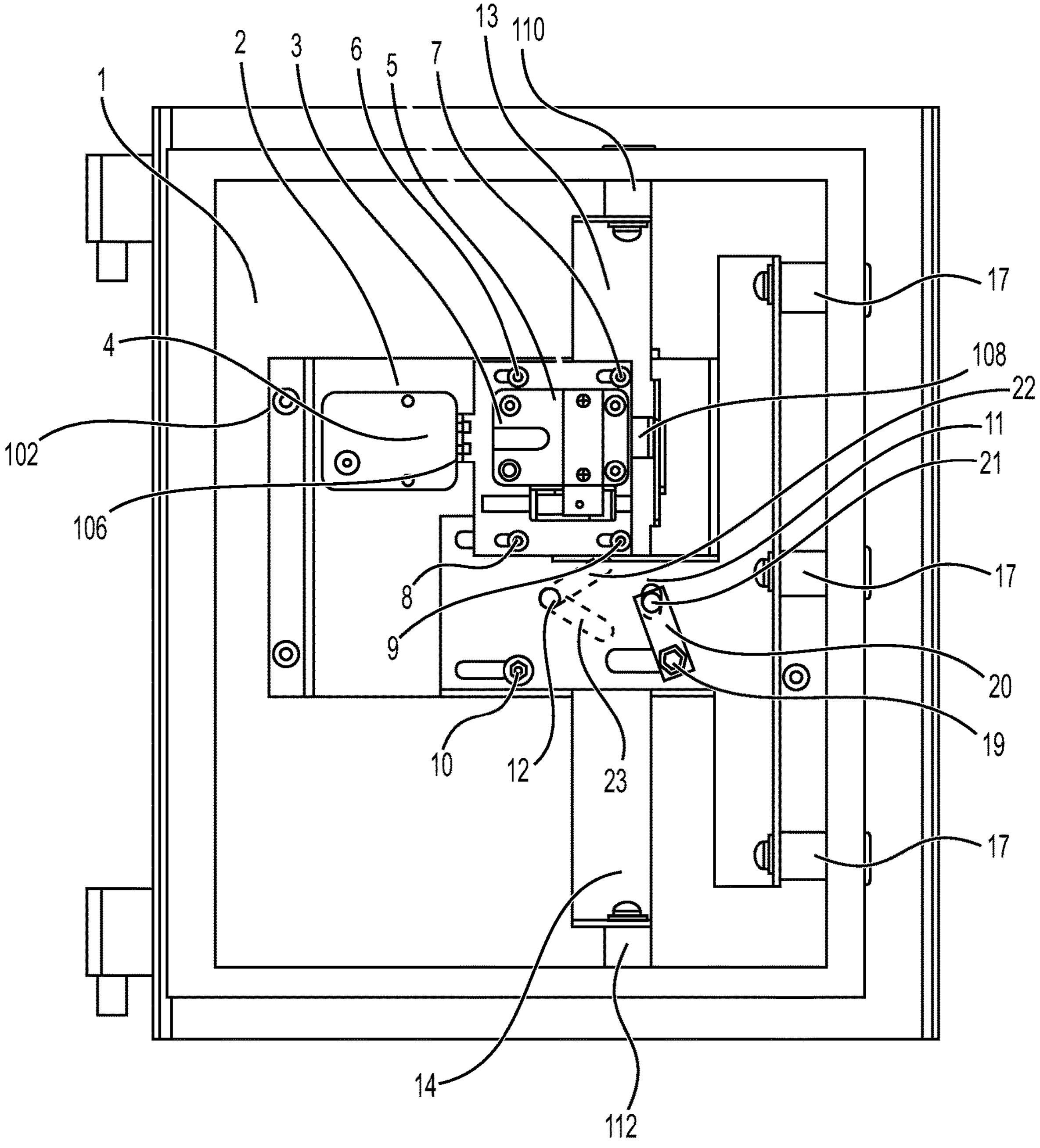
FIG. 3 is a schematic view of the redundant boltwork mechanism after the first safe lock has been opened.

As shown in FIG. 3, when first lock 4 is opened, first lock tongue 106 is retracted into the body and sublock plate 3 is moved to the left. This disengages second lock tongue 108 from first rib 15 and second rib 16. At this time, hand wheel 18 can be rotated causing dial block 20 to also rotate through connecting shaft 19. Dial pin 21 drives cross slide 11 to the left (opening direction) causing door bolts 17 to move to the left. Drive pin 12 causes first slide 13 to move downward and second slide 14 to move upward, retracting upper bolt 110 and lower bolt 112. The safe door 1 can now be opened. This process is reversed to close the safe door 1.

Figure 4:
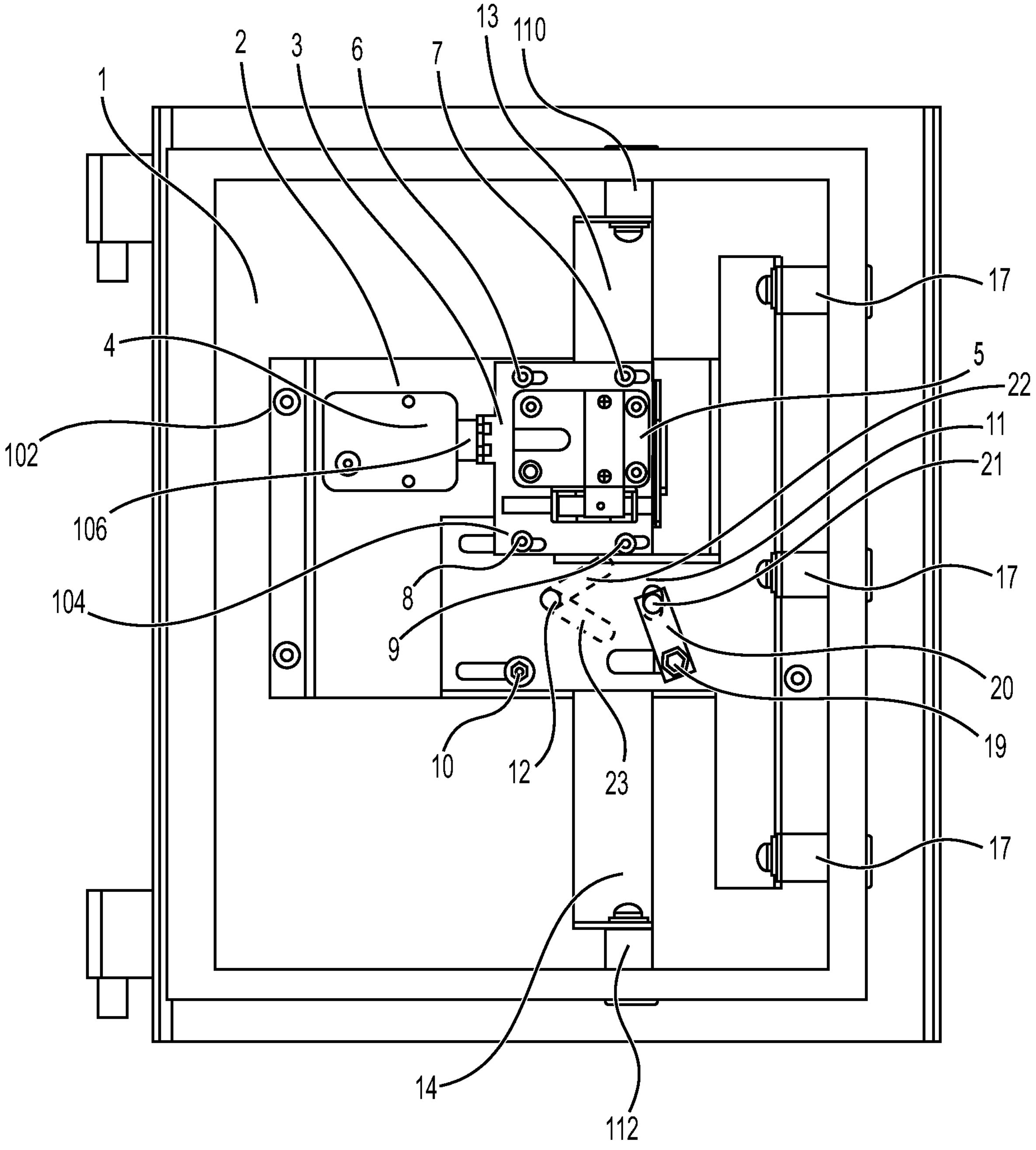
FIG. 4 is a schematic view of the redundant boltwork mechanism after the second lock has been opened.

As shown in FIG. 4, when first lock 4 is closed and second lock 5 is opened, second lock tongue 108 is retracted into the body so second lock tongue 108 is disengaged from first rib 15 and second rib 16. At this time, hand wheel 18 can be rotated causing dial block 20 to also rotate through connecting shaft 19. Dial pin 21 drives cross slide 11 to the left (opening direction) causing door bolts 17 to move to the left. Drive pin 12 causes first slide 13 to move downward and second slide 14 to move upward, retracting upper bolt 110 and lower bolt 112. The safe door 1 can now be opened. This process is reversed to close the safe door 1.

Several embodiments of the present invention are specifically illustrated and/or described herein. However, it will be appreciated that modifications and variations of the present invention are covered by the above teachings without departing from the spirit and intended scope of the invention.

Several embodiments of the present invention are specifically illustrated and/or described herein. However, it will be appreciated that modifications and variations of the present invention are covered by the above teachings without departing from the spirit and intended scope of the invention.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the invention in diverse forms thereof. Any one or more features or functions of the first/other aspects/embodiments disclosed above may also be incorporated into the second/present aspect/embodiment, alone or in any combination.

The invention claimed is:

1. A redundant boltwork mechanism for a safe, the redundant boltwork mechanism comprising:

a master lock plate coupled to an interior of a safe door of the safe;

a first lock immovably coupled to the master lock plate;

a sublock plate slidably coupled to the master lock plate in;

a second lock immovably coupled to the master lock plate;

a cross slide slidably coupled to the master lock plate;

a first slide slidably coupled to the master lock plate in a direction orthogonal to cross slide, wherein the first slide comprises a first rib, wherein rotation of a safe handle of the safe causes simultaneous movement of the cross slide from a first position to a second position and the first slide from a third position to a fourth position;

wherein rotation of the safe handle is prevented when both the first lock and second lock are locked, and wherein rotation of the safe handled is allowed when either the first lock or the second lock is unlocked.

2. The redundant boltwork mechanism of claim 1, wherein a second lock tongue of the second lock abuts the first rib when the second lock is locked to prevent movement of the first slide and the cross slide.

3. The redundant boltwork mechanism of claim 2, wherein the second lock tongue of the second lock does not abut the first rib when the second lock is unlocked to allow movement of the first slide and the cross slide.

4. The redundant boltwork mechanism according to claim 3, wherein the first lock further comprises:

a first lock tongue coupled to the sublock plate, wherein unlocking of the first lock causes retraction of the first lock tongue and movement of the second lock tongue away from the first rib.

5. The redundant boltwork mechanism according to claim 1, wherein the cross slide comprises a plurality of bolts that engage a bolt guide of the safe when the cross slide is in the first position.

6. The redundant boltwork mechanism according to claim 5, wherein the plurality of bolts disengage the bolt guide when the cross slide is in the second position.

7. The redundant boltwork mechanism according to claim 1, further comprising:

a second slide slidably coupled to the master lock plate in a direction orthogonal to the cross slide, wherein rotation of the safe handle causes movement of the second slide from a fifth position to a sixth position in a direction opposite movement of the first slide.

8. The redundant boltwork mechanism according to claim 7, wherein the second slide comprises a second rib.

9. The redundant boltwork mechanism according to claim 8, wherein the second lock tongue abuts the second rib when the second lock is locked to prevent movement of the second slide.

10. The redundant boltwork mechanism according to claim 7, wherein the second slide comprises a lower bolt that engages a bolt guide of the safe when the second slide is in the fifth position.

11. The redundant boltwork mechanism according to claim 1, wherein the first slide comprises an upper bolt that engages a bolt guide of the safe when the first slide is in the third position.

12. The redundant boltwork mechanism according to claim 9, further comprising:

a drive pin coupled to the cross slide and extending through a first oblique groove in the first slide and a second oblique groove in the second slide.

13. The redundant boltwork mechanism according to claim 12, wherein movement of the drive pin within the first oblique groove during movement of the cross slide from the first position to the second position causes movement of the first slide from the third position to the fourth position.

14. The redundant boltwork mechanism according to claim 13, wherein movement of the drive pin within the second oblique groove during movement of the cross slide from the first position to the second position causes movement of the second slide from the fifth position to the sixth position.

15. The redundant boltwork mechanism according to claim 1, wherein the first lock is a mechanical lock and the second lock is an electronic lock.

* * * * *